United States Patent [19]

Kuperman et al.

[11] Patent Number: 4,558,359
[45] Date of Patent: Dec. 10, 1985

[54] ANAGLYPHIC STEREOSCOPIC IMAGE APPARATUS AND METHOD

[75] Inventors: Gilbert G. Kuperman; Donald L. Wallquist, both of Dayton, Ohio

[73] Assignee: The United States of America as represented by the Secretary of the Air Force, Washington, D.C.

[21] Appl. No.: 547,610

[22] Filed: Nov. 1, 1983

[51] Int. Cl.⁴ .............................................. H04N 13/00
[52] U.S. Cl. ...................................... 358/89; 340/729; 350/144; 358/81; 364/522
[58] Field of Search ................... 358/89, 81; 364/522; 350/144; 340/729

[56] References Cited

U.S. PATENT DOCUMENTS

| | | | |
|---|---|---|---|
| 2,865,988 | 12/1958 | Cafarelli | 358/89 |
| 2,910,910 | 11/1959 | Rosenfeld et al. | 88/14 |
| 3,464,766 | 9/1969 | Knauf | 353/6 |
| 3,833,759 | 9/1974 | Ya Tabe | 358/81 |
| 3,943,561 | 3/1976 | Biddlecomb | 358/81 |
| 4,133,602 | 1/1979 | Ihms | 350/132 |
| 4,225,861 | 9/1980 | Langdon et al. | 340/703 |
| 4,290,694 | 9/1981 | Wehrli | 356/2 |
| 4,313,678 | 2/1982 | Colvocoresses | 356/2 |

OTHER PUBLICATIONS

Appl of Digital Image Proc Tech and Hdware to Regional Growth Modeling, T. Driscoll, Proc of the Am Soc of Photogrammetry vol. 1, 45 Annual Meeting, Mar. 18-24, 1979, Wash DC.

A Low Cost Transportable Image Proc System by J. Adams and E. Driscoll, 1st ASSP Workshop on Two-Dimensional Digital Sig Proc, Oct. 3-4, 1979, Lawrence Hall of Science, Berkley, CA.

High Speed, Hdware Class of Multispectral Imagery dup in a Gen Purpose Image Display, by E. Driscoll of I²S, Journal of Applied Photographic Eng. Jan. 82, vol. #3.

Evolution of Image Proc Algorithms fr Sfware to Hdware by T. Driscoll & Co Walker of I²S. Proc of Soc of Photooptical Instrumentation Engs. vol. 271, Feb. 1981, Paper #17.

New Concepts in Display Tech by J. Adams and R. Wallis, Computer Magazine, Aug. 1977, pp. 61-69.

Primary Examiner—Howard W. Britton
Attorney, Agent, or Firm—Donald J. Singer; Gerald B. Hollins

[57] ABSTRACT

An image processing apparatus for aiding analysis of images through the introduction of additonal physically displaced image elements in complementary color which are generated by digital processing of original image elements. The added elements and original image are viewed stereoscopically on an electronic reconstructed image display.

27 Claims, 8 Drawing Figures

ANAGLYPHIC STEREOSCOPIC IMAGE APPARATUS AND METHOD

RIGHTS OF THE GOVERNMENT

The invention described herein may be manufactured and used by or for the Government of the United States for all governmental purposes without the payment of any royalty.

BACKGROUND OF THE INVENTION

This invention relates to the fields of electronic image processing and stereoscopic image analysis.

Stereoscopic imagery in which physically displaced views of the same image are presented simultaneously for conveying the illusion of depth is well known in the art. The patent of A. Rosenfield, U.S. Pat. No. 2,910,910 is an example of stereo imaging wherein two slightly displaced photographs of the same terrain are viewed simultaneously using red and green filtering for the purpose of automatically plotting terrain contour maps. The Rosenfield patent also shows the combination of stereo imaging apparatus and digital computing apparatus.

Another example of stereo imaging apparatus is found in the patent of J. W. Knauf, U.S. Pat. No. 3,464,766 wherein a stereo image is viewed by a person with the aid of a synchronized shutter which alternates the views received by the left and right eye.

The U.S. patent of J.E. Ihms, U.S. Pat. No. 4,133,602 is a recent example of stereo image optical apparatus and discloses the use of a single photographic medium for recording the two images needed for a stereoscopic view. The Ihms patent includes an interesting discussion of the history and state of the art in one portion of the stereoscopic image technology. Another recent example of stereo imaging apparatus is found in the U.S. patent of H. J. Wehrli, U.S. Pat. No. 4,290,694 wherein an apparatus for detecting changes between two photographic views of the same image is disclosed. The Wehrli patent also includes a listing and discussion of prior art in stereo imaging. Another recent example of stereo imaging apparatus is the U.S. patent of A. P. Colvocoresses, U.S. Pat. No. 4,313,678 wherein an apparatus for determining height or elevation of a photographed object is disclosed. The Colvocoresses patent contemplates the use of satellite photography and the measurements of elevation on a terrestrial body.

The U.S. patent of G. G. Langdon et al, U.S. Pat. No. 4,225,861 is of interest with respect to the present invention since it discloses the use of digital electronic processing to change a photographic image into an image having new color components for analysis; the changes being made in response to dimensional elements from the original photograph. The Langdon et al patent does not contemplate the use of stereoscopic viewing or the changing of image element locations however.

The International Imaging Systems (I2S) Model 70E processor used in the preferred embodiment of the invention is described in several application publications which are listed below for both the purpose of incorporation by reference and for consideration as prior art in the field of image processing.

1. "Applications of Digital Image Processing Techniques and Hardware to Regional Growth Modeling" by Ted Driscoll, Proceedings of the American Society of Photogrammetry Vol. 1 45th Annual Meeting, Mar. 18-24, 1979, Washington, D.C. The bibliography and Technical appendix of this article covering the Model 70 processor are of additional interest.
2. "A Low Cost Transportable Image Processing System" by John R. Adams and Edward C. Driscoll, First ASSP Workshop on Two-Dimensional Digital Signal Processing, Oct. 3-4, 1979 Lawrence Hall of Science, Berkley, Calif.
3. "High Speed, Hardware Classification of Multispectral Imagery duplicated in a General Purpose Image Display" by Edward C. Driscoll, Jr. of I2S, Journal of Applied Photographic Engineering June 1982 Vol 8 #3.
4. Evolution of Image Processing Algorithms from Software to Hardware by Ted Driscoll and Chris Walker of I2S. Proc. of Society of Photooptical Instrumentation Engineers, Vol 271 February 1981 Paper #17.
5. New concepts in Display Technology by John Adams and Robert Wallis, Computer, August 1977 p61–69.

The inventors of the present invention also have a copending U.S. patent application for another invention which uses the Model 70E I2S image processor. This application is U.S. Ser. No. 06/556,861 filed Dec. 1, 1983, and contains descriptive material relating to the Model 70E processor; the contents of this application are hereby incorporated by reference.

SUMMARY OF THE INVENTION

An object of the present invention is to electronically modify or transform image density information which may be monochrome or black and white in nature so that a reconstructed color image using the modified information is more easily comprehended by an image analyst. The main characteristic of the invention is the addition of picture elements (pixels or pels) in segregatable color combinations to the original dimensions of an image feature.

A further object of the invention is to provide an image analysis apparatus and method that is usable in analyzing images developed in a large number of different technologies. An exemplary but not exhaustive list of potential applications includes images obtained from radar (especially synthetic aperture radar), sonar, Xray (both medical and technical), sound equipment (sonograms), photographic equipment, temperature or heat sensors (thermograms), seismology or mineral exploration, oceanography, population displays, and mapping.

BRIEF DESCRIPTION OF THE DRAWINGS

FIG. 4, including

DETAILED DESCRIPTION

Figure 1:
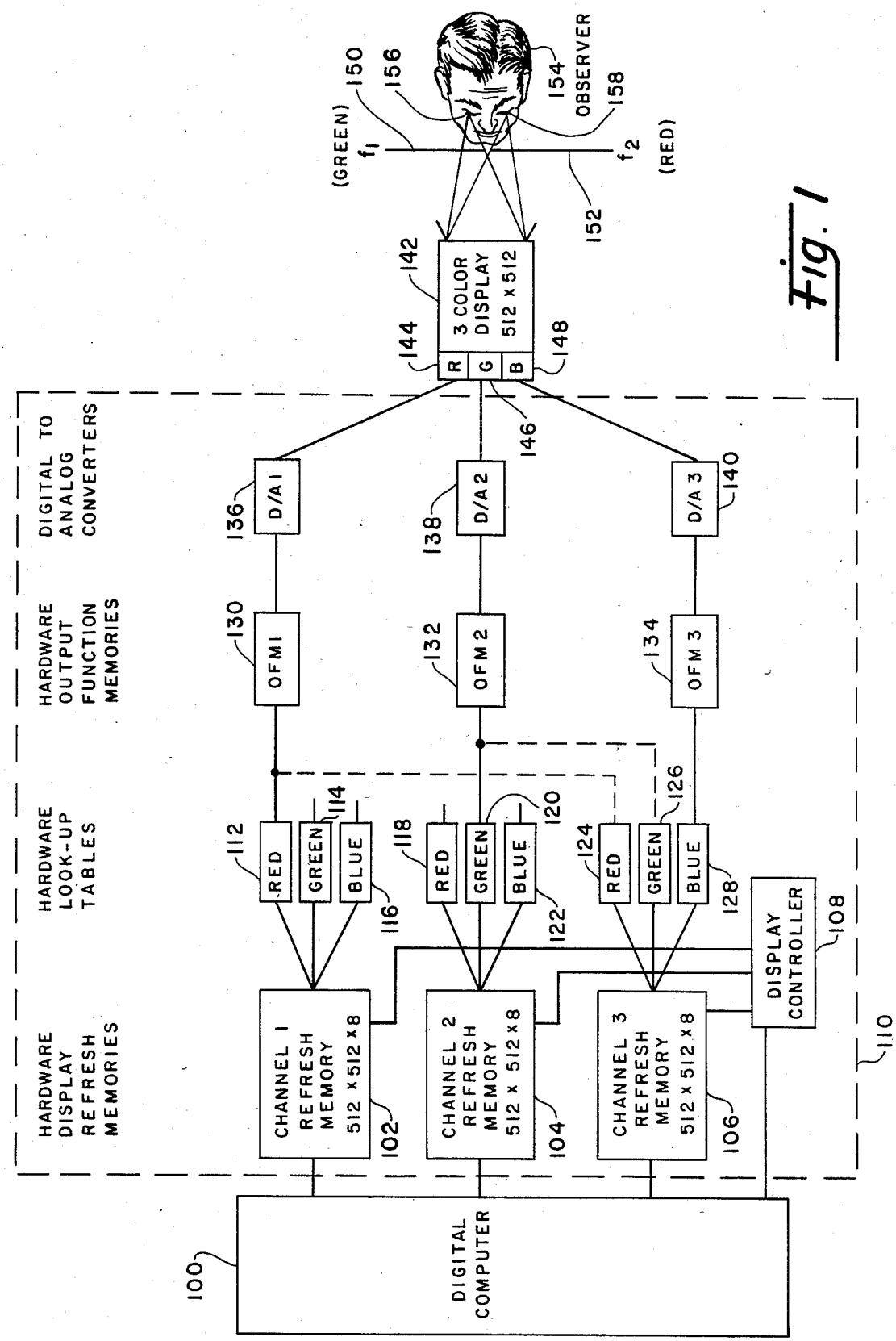
FIG. 1 is a block diagram of the preferred embodiment of the invention.

FIG. 1 is a block diagram of a system for generating anaglyphic stereoscopic images according to the present invention. The term anaglyph is defined in the Random House College Dictionary as being an ornament sculptured or embossed in low relief, as a cameo.

In the present invention, the term anaglyph is understood to refer to an image having relief properties in a third or Z dimension in addition to features defined in the usual X and Y coordinate directions.

The system of FIG. 1 includes a digital computer 100 which may be a Digital Equipment Corporation PDP 11/34 computer or one of many equivalent computers, an image array processor 110; such as the Model 70E Image Array processor manufactured by International Imaging Systems, Inc. of 1500 Buckeye Drive, Milpitas, Calif. 95035 or an equivalent processor; a three color cathode ray tube display 142, optical filter elements 150 and 152; and an observer or analyst 154. The image array processor 110 includes several channels of refresh memory, three of which are utilized in the preferred embodiment of the invention and indicated at 102, 104 and 106 in FIG. 1; these memories are embodied in the form of digital hardware. The I$^2$S processer also includes a plurality of hardware embodied lookup tables indicated at 112-128 in FIG. 1, several hardware output functions memories indicated at 130-134 in FIG. 1, several digital to analog converters indicated at 136-140 in FIG. 1 and a display controller indicated at 108 in FIG. 1. Certain of the elements of the image array processor 110 are shown unused in the embodiment of the present invention; these elements are shown in the interest of clarity and to allow reference to published information for the I$^2$S model 70 processor. The green and blue hardware lookup tables 114 and 116 and the red and blue lockup tables 118 and 122 in FIG. 1 are in this unused group. These tables are software deselected and have no influence on the displayed image. In addition, both the active hardware lookup tables 112, 120 and 124-128 and the output function memories 130-134 are not required for the processing of the present invention and are therefore loaded with 1 to 1 correspondence information so the output of the refresh memories passes unchanged to the display 142.

The three color display 142 in FIG. 1 is similar in appearance and function to the display of a conventional color television receiver except that it is arranged to display images having 512 pixels of information along both the horizontal and vertical picture axes in lieu of the 525 lines used in the NTS television system. Images to be presented by the display 142 are stored in the refresh memories 102,104 and 106 in FIG. 1. Each of these memories has the capability of storing 512×512 words of 8 bits each, the image on the display 142 being defined therefore by 262,144 (512×512) discrete elements or pixels each having a resolution of 8 binary bits or $2^8$ or 256 intensity levels. The three channels of refresh memory allow storing of this quantity of information for three discrete colors which are indicated as red, green and blue in the FIG. 1 apparatus; a gray image usable in an alternate embodiment of the invention can be achieved by exciting all of the display 142 electron guns 144, 146 and 148 as indicated by the connection of outputs from the lookup table memories 124, 126, and 128.

The channel 1 and channel 2 refresh contents are coupled exclusively to the red and green electron guns of the display 142; the channel 1 information is comprised of picture elements to be displayed at or on the left of an original image picture element while channel 2 information is to be displayed at or to the right of an original image picture element. It is to be understood, of course, that the directions of right and left and the assignments of channels and colors are all arbitrary and can be altered with suitable adjustments to the optical filters 150 and 152 and the arrangement of data from the digital computer 100 without changing the essence of the invention.

The display controller 108 in FIG. 1 merely illustrates the existence of some arrangement in the computer 100 and the image array processor 110 for conveying information from the computer and its output bus into a designated refresh memory for display operation. The refresh memories after receiving information from the computer retain the information for repeated access by the display 142 in order to maintain a stable and permanent display image. The refresh memories can also be used to assemble information which is processed and presented by the computer 100 in segments of less than a complete image.

The digital to analog converters 136, 138 and 140 in FIG. 1 provide analog voltage signals suitable for driving the three electron gun inputs of the color display 142. The input to these converters is digital encoded information and the operation of such converters is well known in the art. The color display 142 in FIG. 1 is intended for viewing by a human observer indicated at 154, a different view is presented to the observer's right and left eyes 156 and 158 by way of the green and red color separation filters 150 and 152. In both the green and red filtered view of the reconstructed image the original image which is reproduced in blue will be significantly attenuated or totally suppressed.

Figure 2:
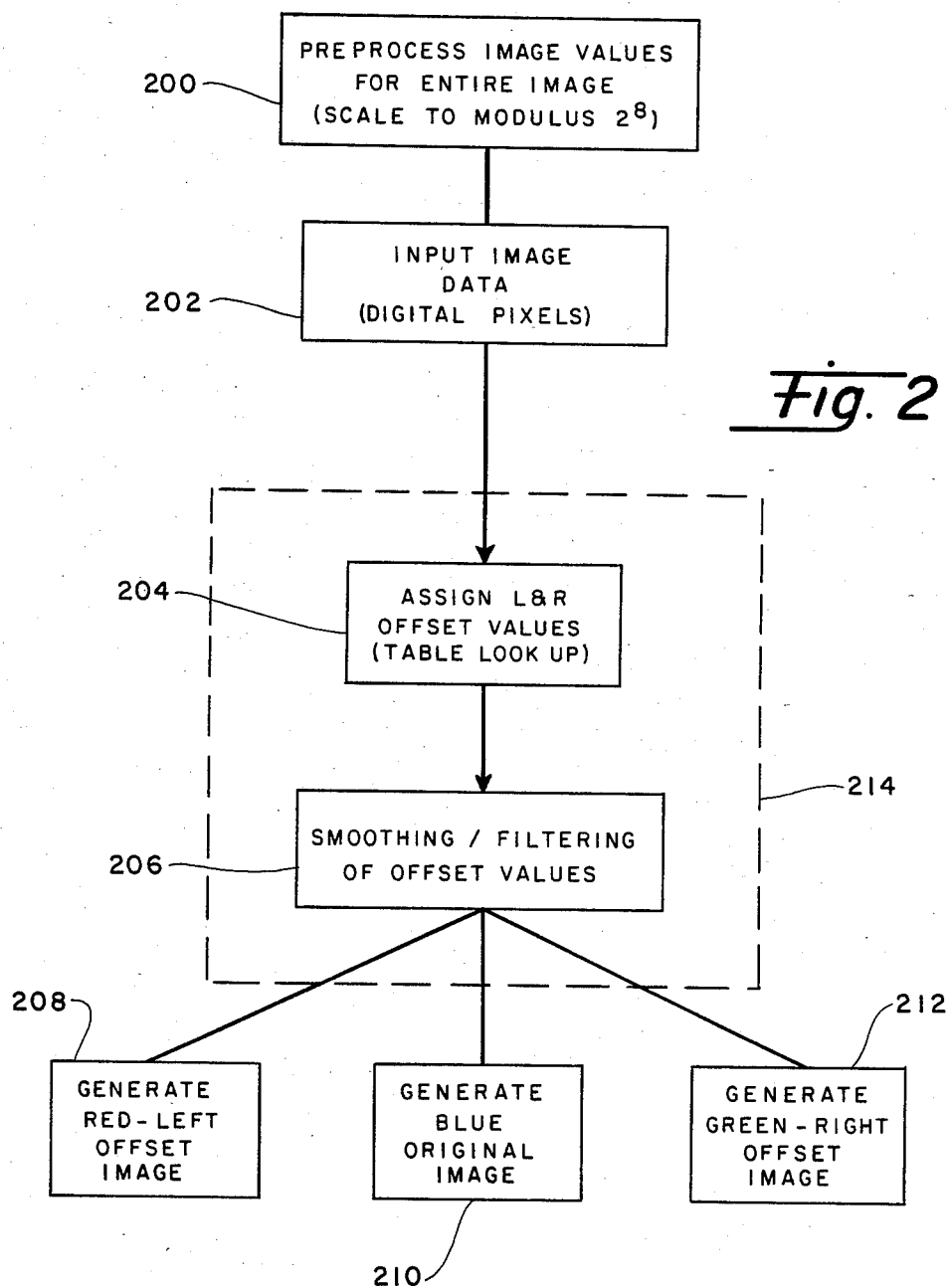
FIG. 2 is a flow diagram for the processing of image information in accordance with the invention.
Figure 3A:
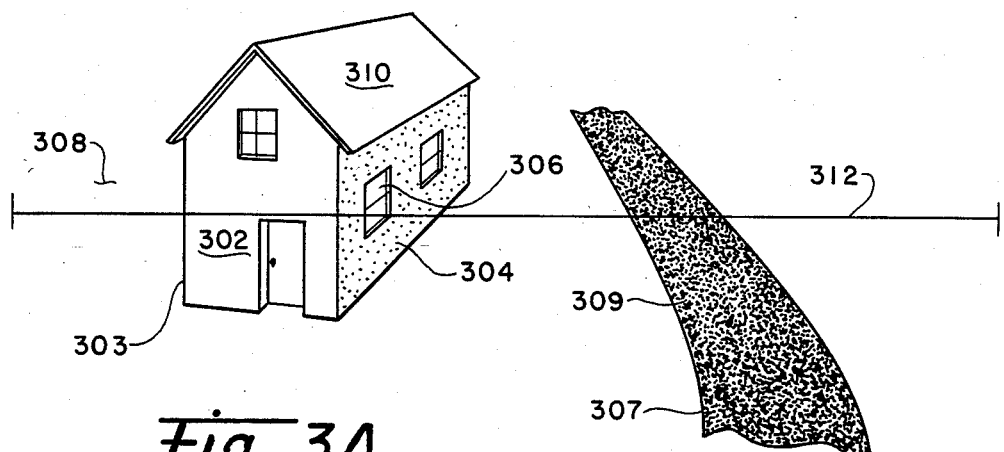
FIG. 3 including FIGS. 3a, 3b and 3c indicates the manner of collecting, processing and displaying electrical signals in the invention.

The image processing to be accomplished in the present invention is shown diagrammatically in the sequence chart of FIG. 2; this sequence can best be understood by reference to the examples shown in the three views of FIG. 3 wherein FIG. 3a showns a simulated image such as might be encountered in an aerial photograph or a radar map. The objects in FIG. 3a include a building 310 having a light colored frontal surface 302, a somewhat darker colored side surface 304, and one or more windows 306, together with a segment of darkly colored road surface 309. It is to be understood that the type of image and the objects of FIG. 3a are selected merely for the purpose of illustration and that the density or relative light and dark colorations of the surfaces depicted in this figure are of interest in the electronic processing to be accomplished; other images such as those obtained with X-ray or thermogram apparatus (with smooth and continuous changes of object density) would provide more graphic but more difficult to draw and explain examples of processing done in accordance with the invention. The analysis of images obtained with medical X-ray equipment and human subjects for example is found to be particularly aided by the use of the present invention.

Figure 3B:
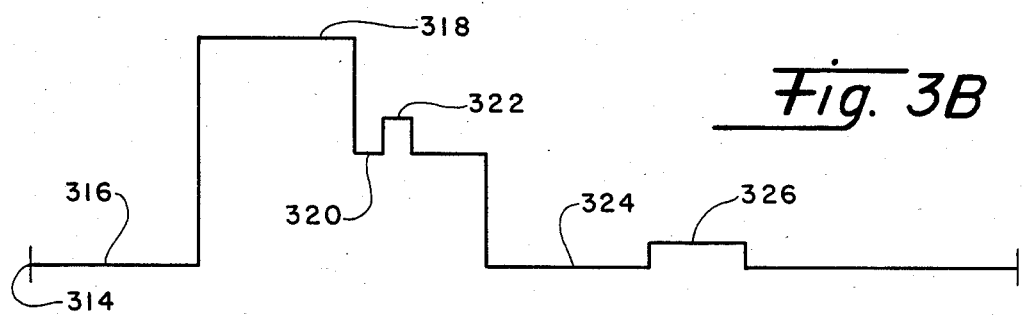

Scanning of the objects shown in FIG. 3a by way of a flying spot scanner or an image orthicon or a solid state photosensor array or other techniques which are known in the art produces a video signal generally as shown in FIG. 3b—when the scanning is done along the line 312 shown in FIG. 3a. In the FIG. 3b video signal the background 308 is assumed to be totally black as indicated by the low amplitude at 316 and 324 while the very light color of the frontal surface 302 is indicated by the high amplitude signal 318. The successively darker appearance of the window 306, the side surface 304, and the road 309 are shown respectively at 322, 320 and 326 in FIG. 3b.

It is the intention of the invention that supplemental and physically offset image elements or pixels be added to the image elements of the objects shown in FIG. 3a at locations which are displaced in proportion to the density of the original object picture element as observed by the scanning apparatus. The processing therefore involves generating for each pixel of image feature information in a scan, additional pixels of information which are to be located immediately preceeding and immediately succeeding the original pixel in a reconstructed image. The preceeding pixels of information are displayed in a second color different from that of the original pixel and the succeeding pixels are displayed in a third color different from that of the original pixels and the preceeding pixel. The location of the added or offset pixels with respect to the original pixel is directly related to the density or intensity or amplitude of the orignal pixel. The preferred embodiment of the invention contemplates that the reconstructed image include therefore pixels of red, green and blue color for example even though the original image was monochromatic in nature. The preferred embodiment further contemplates that the three color reconstructed composite or summation image will be viewed stereoscopically or binocularly using color separation filters to achieve a view which appears to have depth or three dimensions.

When the scanning of FIGS. 3a and 3b is performed by the FIG. 1 apparatus there will be generated 512 pixels of image data, each pixel being of modulus $2^8$ or 256 intensity levels with the overall video signal having the appearance of the waveform shown in FIG. 3b when the scan is performed as indicated at 312 and 314.

Figure 3C:
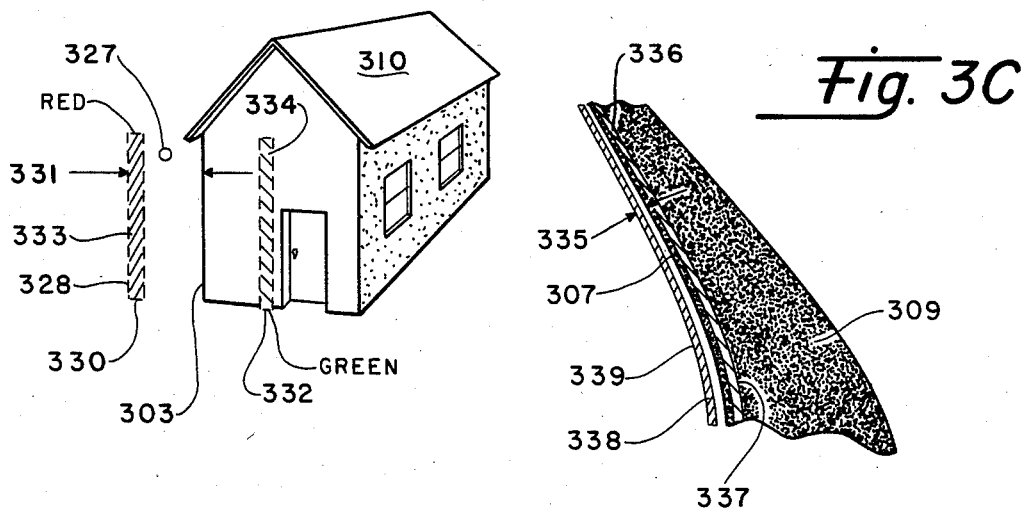

FIG. 3c is a partial representation of a reconstructed image which has been processed in accordance with the invention from the scans shown at 312 and 314. In FIG. 3c the original FIG. 3a image component is reproduced pixel for pixel excepting for slight drawing modifications allowing illustration of the supplemental or offset pixels that will result from certain features in the FIG. 3a scene. A complete drawing of a reconstructed image from FIG. 3a would require the use of colors and be visually complex. The shading which would indicate the blue color of the FIG. 3c original image features, according to the preferred embodiment of the invention, is not shown in the interest of preserving drawing clarity in FIG. 3c. The original image features in FIG. 3c can also be reproduced in grey as is described below.

FIG. 3c illustrates reconstructed image features generated by the processing of the present invention in response to scanning the first pixels inside the FIG. 3a boundary lines 303 and 307, assuming the video signal from each FIG. 3a scan is substantially as shown in FIG. 3b. The first pixels inside the boundary 303 are of high intensity as illustrated at 318 in FIG. 3b and will result in a large separation between the offset and the causing pixels as indicated by the wide spacing 331 for the left offset pixels 330. A similar wide spacing occurs for the right offset pixels 332 the intent of the invention being that the offset spacing be in proportion to the original image pixel intensity of brightness or density or amplitude of height—whichever is an appropriate description of the video signal amplitude in the image being processed. An X-ray image is usually described in terms of image density for example while a photograph of the sun could be described in terms of brightness and a radar image could be described in terms of return signal amplitude and an aerial photograph in terms of height or elevation. These terms are used interchangeably in describing the invention herein.

It is intended that the offset pixels be presented in a first color such as red as indicated by the shading 333 for the left offset pixels and that the right offset pixels be of a second color such as green as indicated by the shading at 334. The red, green and blue colors are of course examples and could be replaced with other mutually exclusive colors or with other mutually exclusive image presentations such as vertical and horizontal light polarizations, as is known in the art.

The lower video signal amplitude 326 representing the road 309 in FIG. 3a results in offset image pixels being displaced by a smaller distance as is shown at 335 in FIG. 3c. The offset pixels 339 and 337 are generated in response to the original image pixels adjacent line 307. The offset pixels from these first pixels of the road 309 are also displayed in red and green colors as indicated at 338 and 336.

The different displacements of the offset pixels resulting from the differing video levels at 318 and 326 as shown by the dimensions 331 and 335 in FIG. 3c illustrate the intention of the invention that the displacement of offset pixels be predictably related to the density of the original image; this relationship may be linear or nonlinear in nature without departing from the spirit of the invention. A linear relationship found useful in the preferred embodiment of the invention is shown in Table 1.

TABLE 1

| Input Image Pixel (Density, Height, Intensity) | Left and Right Offset Pixel Displacement |
| --- | --- |
| 0–31 | 0 |
| 32–63 | 1 |
| 64–95 | 2 |
| 96–127 | 3 |
| 128–159 | 4 |
| 160–191 | 5 |
| 192–223 | 6 |
| 224–255 | 7 |

As illustrated by these values it is found useful in embodying the invention to divide the 256 possible pixel intensities into eight equal ranges of 32 intensity levels each and assign one increment of offset space or one pixel location of space to each of these eight ranges. As described below a maximum displacement of 8 pixel locations was found to be most effective in embodying the invention; however, other maximum displacements could be and have been employed. A nonlinear relationship between input image density and the number of offset pixels could, for example, change the numbers in the right hand column of Table 1 in accordance with a logarithmic or exponential or other mathematical function; the increment between column 2 numbers would in such instance be non constant and vary according to the selected mathematical relationship.

From the foregoing description of the invention it will be apparent that there can develop at certain pixels of the reproduced image a competition for the utilization of a particular pixel as part of the original image component, part of one or more left offset image components and part of one or more right offset image components. Generally, this competetion is resolved in the image processing by supplying to the reconstructed image display, signals which will first reconstruct the original image component in blue color. With the original image displayed, competetion between two left displaced or red pixel signals is resolved by displaying the stronger of the two competing pixels. Similarly competition between two right displaced or green pixel signals is resolved by displaying the stronger of the green signals. When the competition is between a left and right offset pixel signal the competition is resolved by illuminating both a red and green color for the pixel, the two electron guns and shadow mask inherent in a cathode ray tube embodiment of the display permitting simultaneous excitation of two different colors.

Near the edges of the reconstructed image, it is apparent that some of the offset pixels could extend beyond the boundary of the original image by the number of pixels selected for displacing early and late original image pixels. Extension beyond the original boundaries can be resolved by either omitting the over extending pixels or providing additional space on the reconstructed image display, omission being preferable in most embodiments.

FIG. 3c illustrates the supplementing of original image pixels without discussing the status of reconstructed image intermediate pixels—pixels indicated at 327 which lie in the locations between the original and displaced pixels. These intermediate pixels may of course be illuminated as a part of the original image or as part of the left displaced or right displaced pixels from subsequent original image pixels. A final possibility for the intermediate pixels is that they be dark or of zero intensity in which case the filtering and smoothing functions described below may cause artificial illumination for cosmetic or appearance purposes. If none of these mechanisms operate to illuminate an intermediate pixel it will remain dark.

It will also be apparent from the discussion of FIG. 3a and 3b that conditions will arise wherein differing maximum (and minimum) video signal amplitudes require that different increments of video signal be used in order that the video signal be resolved into the 256 equal increments desired in the preferred embodiment apparatus. This scaling or gain control function is indicated in the flow diagram of FIG. 2 at 200 and can be accomplished by a variety of techniques which are known in the art including both digital and analog signal processing. A digital scaling arrangement is used in the preferred embodiment of the invention as is described in connection with the computer program subsequently.

FIG. 2 shows a flow diagram by which an input image may be scanned, the resulting signals subjected to signal processing in accordance with the present invention and the processed signals used to form a reconstructed image. In FIG. 2 the block 200 indicates preprocessing of the image intensity values such that the processed image employs the 256 discrete levels of intensity or image density value. As indicated above, this preprocessing is accomplished by digital techniques in the preferred embodiment of the invention and can include a mathematical operation of subtracting the lowest density value in the image to be processed from the highest density value and dividing the difference by the number 256 to determine the intensity or density value to be assigned to each increment of preprocessed image or density. This preprocessing could be performed on partial segments of the image to be processed such as 1 scan line but is preferably performed on the entire image.

At block 202 in FIG. 2 the preprocessed image data is transmitted, preferably in increments of one scanning line, or 512 pixels of intensity modulus $2^8$, into the processing apparatus, the digital computer 100. The processing steps accomplished in the digital computer are indicated by the box 214 in FIG. 2 and include assignment of left and right offset pixed displacement values by way of a software table look-up as shown at block 204 and the smoothing or filtering of pixel intensities for cosmetic purposes as shown at block 206. In the preferred embodiment of the invention the filtering/smoothing of pixel intensities was selected to replace offset pixels of zero intensity with some intermediate pixel intensity where the zero intensity pixel is located near a non zero offset pixel. Other smoothing/filtering algorithms could of course be employed without departing from the spirit of the invention.

Following the assignment of offset values and smoothing/filtering of these values, information for forming the reconstructed image is transmitted to the image display apparatus shown in the blocks 110 and 142 in FIG. 1 as is generally indicated by blocks 208, 210 and 212 in FIG. 2.

COMPUTER PROGRAM

Figure 4A:
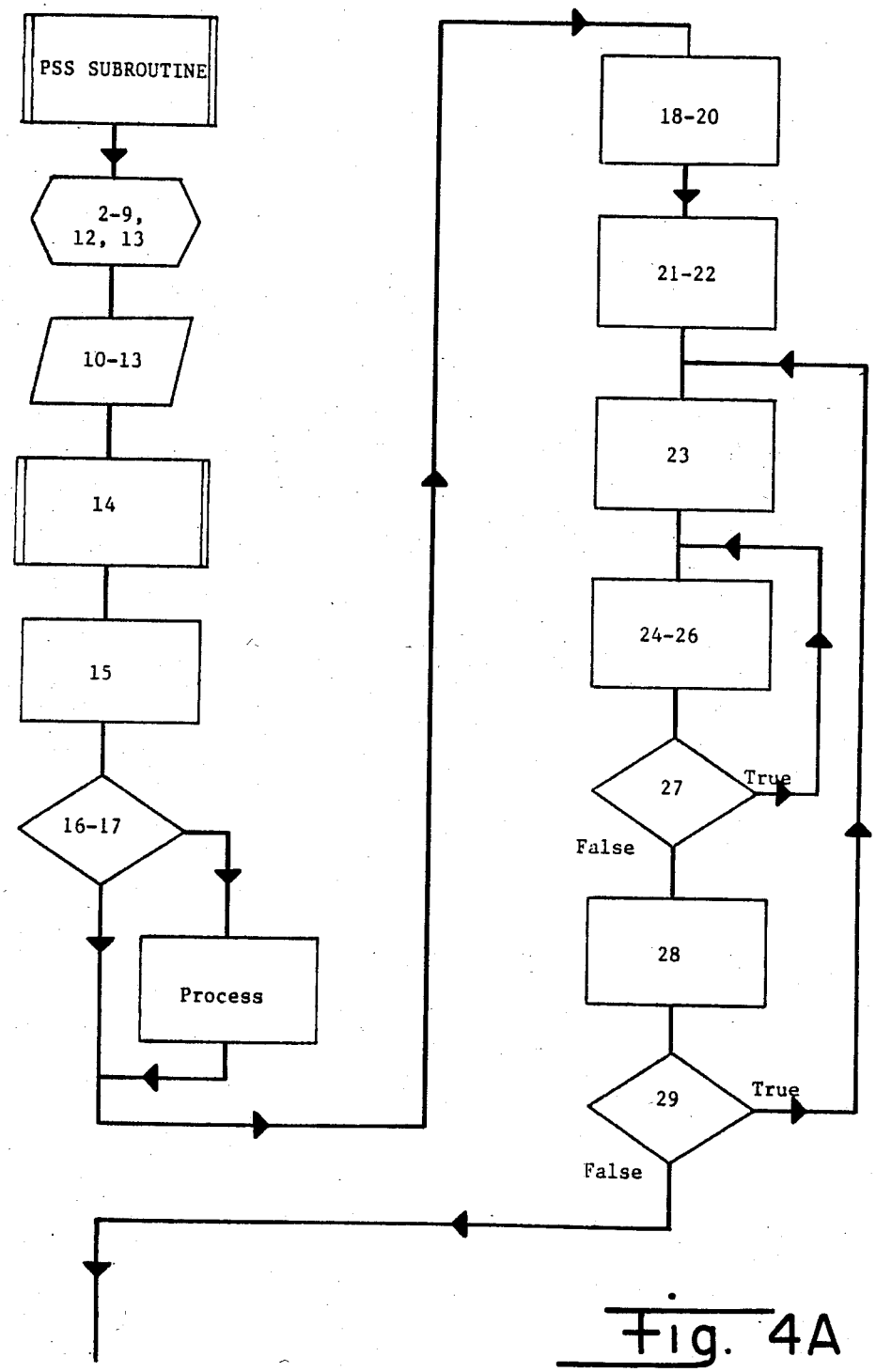
FIGS. 4a, 4b and 4c is a flow diagram.
Figure 4B:
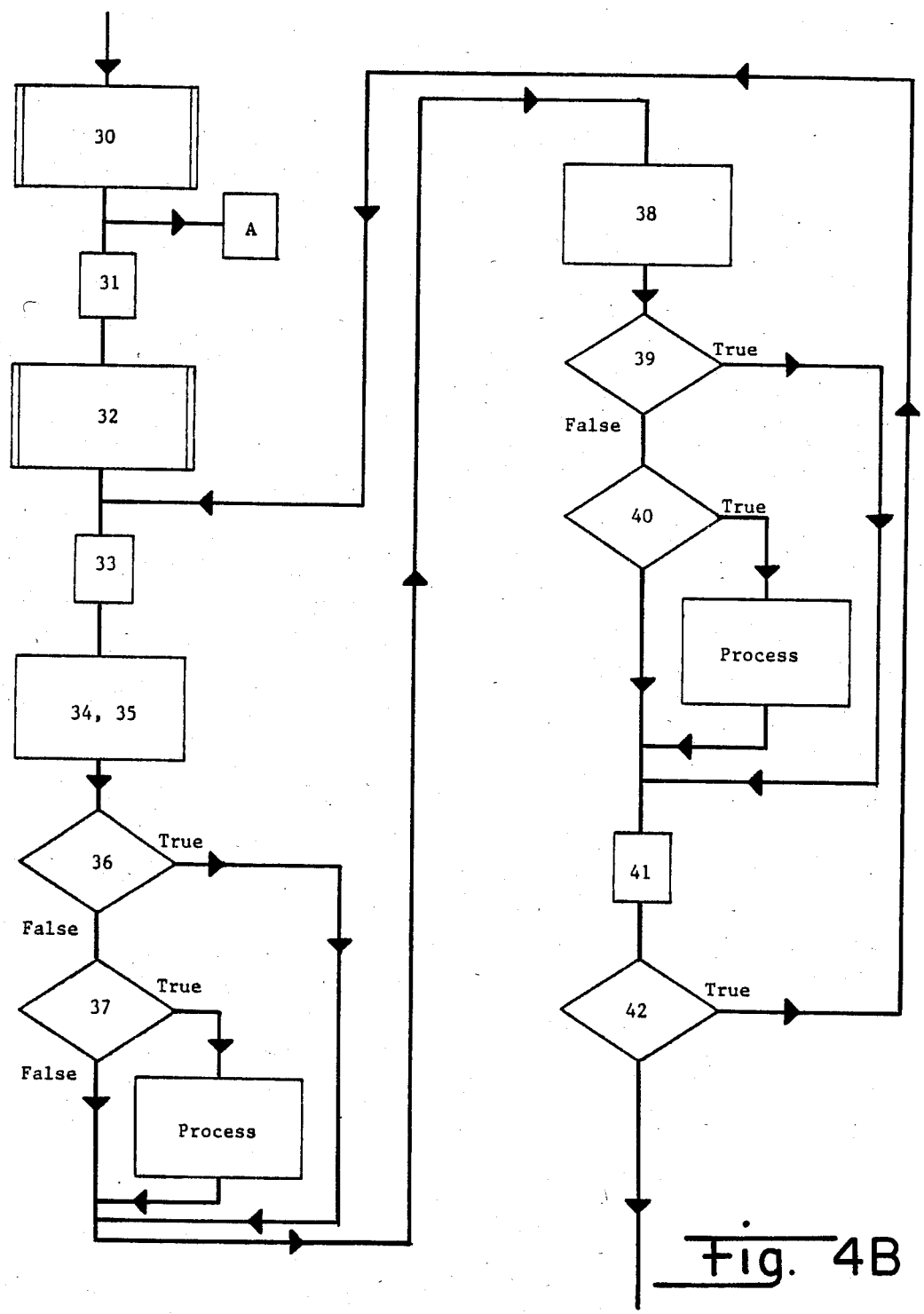
Figure 4C:
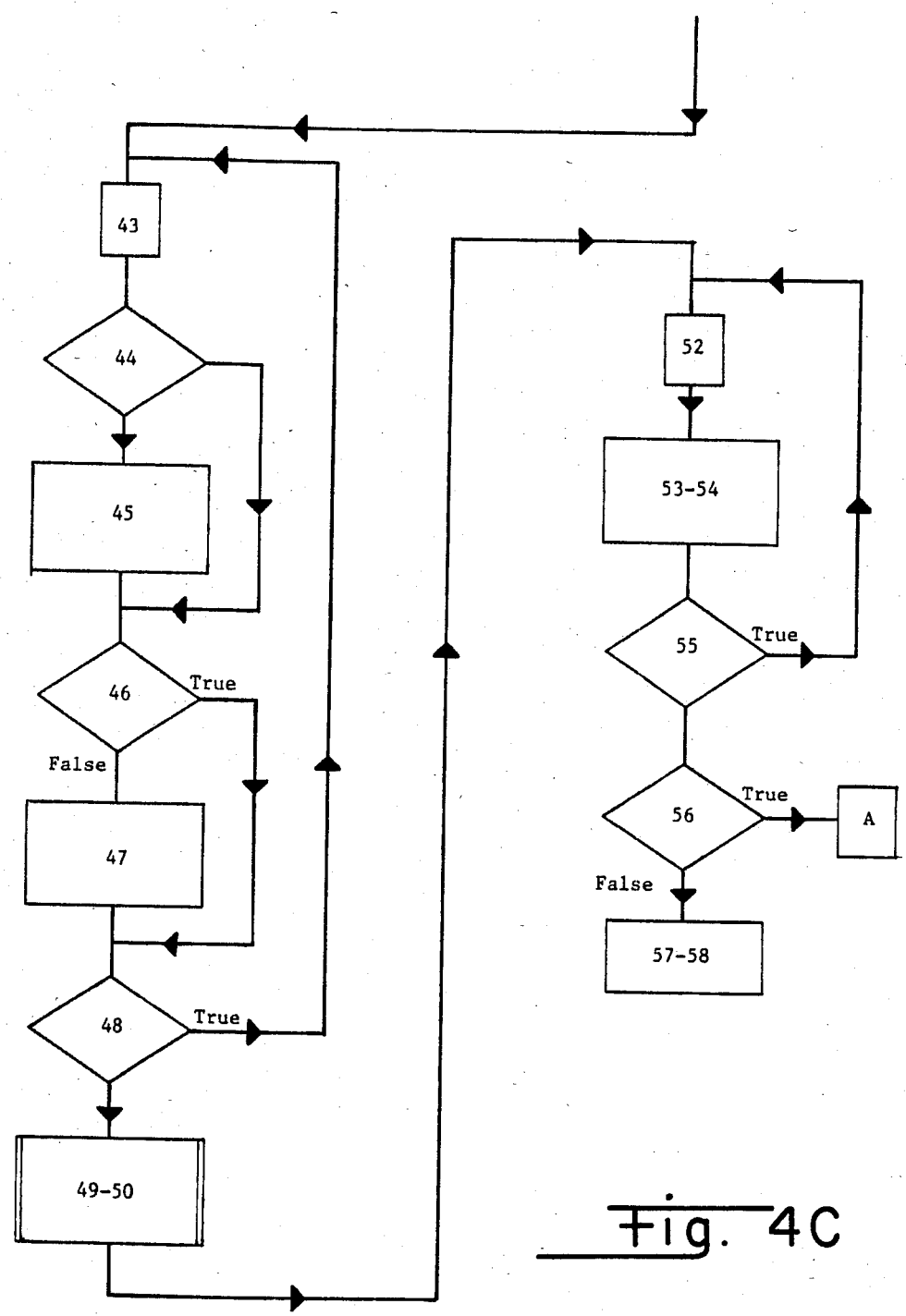

The computer program used in embodying blocks 204 and 206 in FIG. 2 is shown below in this specification. A related flow diagram is shown in FIG. 4 of the drawings in three portions. FIG. 4a, FIG. 4b and FIG. 4c. This program employs the Fortran IV programming language and includes programming comments to explain the function being performed. This annotated program in a common programming language will generally be understood by persons skilled in programming art without lengthy or detailed additional comments; a few comments to to allow faster comprehension of the program are therefore the extent of the present description. In the FIG. 4 diagram the numbers located within flow diagram boxes correspond to line numbers in the program listing. The boxes in the FIG. 4 flow diagram have the shape-to-performed function relationships known in the computer art.

As will be readily appreciated by readers skilled in the programming art, the letter C appearing before certain lines in the program listing, such as the lines between lines 1 and 2, denote comments which are ignored by the computer; additionally, certain lines in the program such as lines 14 and 30 call for the execution of subroutines which may be used repeatedly or which may be used in other programs. The function performed by a called subroutine is annotated in the notes immediately preceeding the call statement. The entire program listing shown herein is itself actually a subroutine which is named PSS and which is called for execution by a general operating system level program. The operating system program serves to host or provide a supporting framework for the program shown herein and could be one of many operating systems which are known in the art.

Generally the program shown in this specification down to the comment regarding setting up of the offset table following line 21 is comprised of housekeeping functions involving the assignment of variable types, definition of variables so as to be accessible between the listed program and its operating system program, the declaration of starting values, clearing of the image array processer memories, and the testing for operator elected input parameters.

The program step at line 21 involves correlating or fitting the 256 intensity levels in the preprocessed image data into the elected maximum pixel displacement. A maximum displacement of eight pixel locations is used in the preferred embodiment as is described in connection with Table 1 above.

The computer program steps establishing the look-up table for offset pixel displacement appear following line 23 in the program listing. In the preferred embodiment of the invention 32 intensity levels are assigned to each increment of pixel displacement with intensity levels 1 through 32 receiving no offset as was also indicated in Table 1.

Following development of an appropriate lookup table for offset value assignment, the program deals with the assignment of image array processor channels to the display color input and treats the four quadrant input capability of the image array processer. The program then enters a series of nested loops to perform pixel information processing. The nested loops, two of which are indicated by the statements DO 300 and DO 400, at lines 31 and 33 respectively require execution of subsequent statements, down through the labels 300 and 400 respectively, for a number of times determined by the values assumed by the variables ROWPTR and COLPTR between limits of 1 and NUMROW and 1 and NUMCOL respectively. These nested loops compute pixel element offset values and transmit information between the computer disc memory and the image array processor and are shown in FIG. 4b of the FIG. 4 flow diagram.

The actual determination of right and left offset displacement is accomplished by the IOFF=statements within the nested loops, for each scanning line of the reconstructed image. Overflow of offset images beyond the extent of the display screen is handled by the two IF IOFF statements. Resolution of possible competetion for intensities is resolved by the IF (RIGHT) statement. Smoothing of the reconstructed image data over the selected range of plus and minus 2 pixel locations is achieved by the statements following the DO 510 instruction at line 43 of the program and in FIG. 4c of the flow diagram. The transmitting of computed information for the reconstructed image to the image array processor is accomplished by the subroutine IMAGE which is called by the three statements at lines 49–51 following the smoothing operations.

ALTERNATE EMBODIMENTS

In general the present invention contemplates the electronic generating of supplemental or offset image elements which are located on either side of the causing original image pixel and are displayed in separately viewable fashion to obtain a stereoscopic appearing view. This stereoscopic view is found to be more readily comprehended by human facilities as to image detail than was the original planar view of the image. The ability to use a viewer's depth perception ability which is notably sensitive and well developed in most persons has been found especially useful in analyzing complex and finely detailed features in an image such as is obtained with radar or X-ray equipment.

The disclosed embodiment of the invention employs a digital computer and associated software for embodying certain portions of the invention; these elements of the embodiment could of course be replaced with electronic hardware including ROM and RAM memory integrated circuit chips if desired. A hardware embodiment of these portions of the invention would probably increase the operating speed of the image processing operation at the expense of an increase in apparatus fabrication cost.

As disclosed in the preferred embodiment of the invention, equally displaced left and right offset pixels are contemplated except as the illustration of the offset pixels may be affected by smoothing or pixel competetion; the use of non-symetric offsets or the absence of either the left or right offset pixels could of course be readily arranged in the preferred embodiment processing and could be desirable for some uses of the invention. In particular the reconstructed image has the stereoscopic appearance of leaning in one direction where the left and right offset displacements are intentionally made non-symetric.

Another embodiment of the invention is also possible wherein the left offset pixels and the right offset pixels are displayed in monochrome photographs or monochrome displays of any of the type known in the art. An embodiment of this type would allow use of the invention by operators who are unable to distinguish colors. In this embodiment the left and right monochrome images are viewed stereoscopically in a manner known in the art; such viewing might include the apparatus of the earlier referred to patents of J. W. Knauf, U.S. Pat. No. 3,464,766 or H. J. Wehrli, U.S. Pat. No. 4,290,694, which are hereby incorporated by reference. An embodiment of this type would not require the image array processor apparatus 110 which was used in the multiple color display embodiment described above but could apply displaced pixel signal information directly to an imaging apparatus. An embodiment of this type could for example use facsimile equipment which converts directly from electronic signals to an output image without the intermediate step of displaying the image on a screen.

Another photographic related embodiment of the invention could employ color sensitive photographic film which is exposed in separate colors from a multicolor electronic display and subsequently viewed stereoptically.

Yet another embodiment of the invention is implied in the monochromatic photographic embodiment described above and involves omission of the original image features from the reconstructed image of the preferred embodiment. It has been found that presence of the original image is visually pleasing but not essential in the reconstructed image. Omission of the original image in the preferred embodiment would include omitting the blue displayed features or component and the channel 3 apparatus in the image array processor 110. The blue displayed original component is found to be useful primarily when the reconstructed image is viewed with the naked eye—without stereoscopic separation filters; the blue original component is suppressed by the red and green stereoscopic filters 152 and 150 and therefore absent in the normal stereoscopic view of the reconstructed image.

The outputs from the hardware lookup tables 124 and 126 which are shown as dotted lines in FIG. 1 can be used in another embodiment of the invention wherein the original image components are displayed in shades of gray in lieu of the preferred blue. Use of gray original image components has been found to be less desirable and lacking the degree of clarity found with the blue colored original component embodiment of the invention.

While the apparatus and method herein described constitute a preferred embodiment of the invention, it is to be understood that the invention is not limited to this precise form of apparatus or method and that changes may be made therein without departing from the scope of the invention which is defined in the appended claims.

```
0001      SUBROUTINE PSS

CCCCCCCCCCCCCCCCCCCCCCCCCCCCCCCCCCCCCCCCCCCCCCCCCCCCCCCC
C                                                       C
C Fortran type declarations (lines 0002-0006)           C
C                                                       C
CCCCCCCCCCCCCCCCCCCCCCCCCCCCCCCCCCCCCCCCCCCCCCCCCCCCCCCC 0002      BYTE ORIG(512)
0003      LOGICAL SEMROW,SEMLU,REVERS,REVH
0004      INTEGER DUMMY(1024),FCB(6),OTHER(7),ROW,COL, PRIOR
0005      INTEGER RED(4),GREEN(4),BLUE(4),CH1,CH2,CH3,
         +       ROWPTR,COLPTR,LEFT,RIGHT,ORIG,OFFSET
0006      INTEGER*4 TMP CCCCCCCCCCCCCCCCCCCCCCCCCCCCCCCCCCCCCCCCCCCCCCCCCCCCCCCC
C                                                       C
C Fortran 'COMMON' statements which allow this subroutine to   C
C    share the same computer memory area between subroutines   C
C    and the main image operating software.  (lines 0007-0008) C
C                                                       C
CCCCCCCCCCCCCCCCCCCCCCCCCCCCCCCCCCCCCCCCCCCCCCCCCCCCCCCC 0007      COMMON /SEMBUF/ B1(256),RIGHT(512),LEFT(512),ORIG(512),
         +                OFFSET(25)
0008      COMMON /SEMLVS/ PRIOR,LVS(5,8),LV1,LV2,LV3,NUMCOL, NUMROW,
         +                OTHER(7)

CCCCCCCCCCCCCCCCCCCCCCCCCCCCCCCCCCCCCCCCCCCCCCCCCCCCCCCC
C                                                       C
C Fortran 'EQUIVALENCE' statement which allows arrays and vari- C
C    ables to share the same locations within the same subroutine C
C    or program and which have different names and may be of   C
C    different data types.      (line 0009)             C
C                                                       C
CCCCCCCCCCCCCCCCCCCCCCCCCCCCCCCCCCCCCCCCCCCCCCCCCCCCCCCC

0009      EQUIVALENCE (B1,ORIG),(DUMMY,LEFT),(DUMMY(513),RIGHT)

CCCCCCCCCCCCCCCCCCCCCCCCCCCCCCCCCCCCCCCCCCCCCCCCCCCCCCCC
C                                                       C
C Data Declarations:                        (lines 0010-0011)  C
C                                                       C
C    Variable  Full name   Default           Action     C
C    --------  ---------   -------   --------------------------  C
C    ROWH      ROW         1         Position of image on array  C
C                                    processor.                  C
C    COLH      COLUMN      1         Same as above.              C
C    OFFH      OFFSET      8         Maximum offset in left or   C
C                                    right image.                C
C    REVH      REVERSE     FALSE     Allows left shift image to be C
C                                    placed in channel one and right C
C                                    shift image in channel two; C
C                                    this will reverse the direction C
C                                    of the visual effect as switch- C
C                                    ing the color filters.      C
C                                                       C
CCCCCCCCCCCCCCCCCCCCCCCCCCCCCCCCCCCCCCCCCCCCCCCCCCCCCCCC
```

```
0010      DATA MASK/"000377/
0011      DATA ROWH/3RROW/,COLH/3RCOL/,REVH/3RREF/,OFFH/3ROFF/
```

```
CCCCCCCCCCCCCCCCCCCCCCCCCCCCCCCCCCCCCCCCCCCCCCCCCCCCCCCCCCCCCCCCC
C                                                                 C
C Fortran data initialization statements that allow the program-  C
C    mer to declare the initial starting values of the variables  C
C    or arrays without using many assignment statements.          C
C                                                                 C
C        CH1 → channel one of image array processor.              C
C        CH2 → channel two of image array processor.              C
C        CH3 → channel three of image array processor.            C
C                                                                 C
C    When an image is displayed on the image array processor      C
C    monitor it is displayed using a four quadrant system:        C
C                                                                 C
C               :..................:                              C
C               :         :        :                              C
C               :         :        :                              C
C               :    1    :   2    :                              C
C               :         :        :                              C
C               :.........:........:                              C
C               :         :        :                              C
C               :         :        :                              C
C               :    3    :   4    :                              C
C               :         :        :                              C
C               :.........:........:                              C
C                                                                 C
C    Quadrants →    1     2     3     4                           C
C                  ---   ---   ---   ---                          C
C        RED        1     1     1     1                           C
C        GREEN      2     2     2     2                           C
C        BLUE       4     4     4     4                           C
C                                                                 C
CCCCCCCCCCCCCCCCCCCCCCCCCCCCCCCCCCCCCCCCCCCCCCCCCCCCCCCCCCCCCCCCC
```

```
0012      DATA CH1/1/,CH2/2/,CH3/4/
0013      DATA RED/1,1,1,1/,GREEN/2,2,2,2/,BLUE/4,4,4,4/
```

```
CCCCCCCCCCCCCCCCCCCCCCCCCCCCCCCCCCCCCCCCCCCCCCCCCCCCCCCCCCCCCCCCC
C                                                                 C
C This is a user supplied subroutine that will clear all image    C
C    channels and place zeros in all pixel locations. (line 0014) C
C                                                                 C
CCCCCCCCCCCCCCCCCCCCCCCCCCCCCCCCCCCCCCCCCCCCCCCCCCCCCCCCCCCCCCCCC
```

```
0014      CALL BCHAN(FCB,DUMMY,3,255)
```

```
CCCCCCCCCCCCCCCCCCCCCCCCCCCCCCCCCCCCCCCCCCCCCCCCCCCCCCCCCCCCCCCCC
C                                                                 C
C  If the logical variable 'REVERS' was true then assign the      C
C     right offset image to channel one (CH1) and assign the      C
C     left offset image to channel two (CH2).  (lines 0016-0017)  C
C                                                                 C
CCCCCCCCCCCCCCCCCCCCCCCCCCCCCCCCCCCCCCCCCCCCCCCCCCCCCCCCCCCCCCCCC
```

```
0016      IF   (REVERS)   CH1=2
0017      IF   (REVERS)   CH2=1
```

```
CCCCCCCCCCCCCCCCCCCCCCCCCCCCCCCCCCCCCCCCCCCCCCCCCCCCCCCCCCCCCCCCC
C                                                                 C
C  'IVAL' is a user supplied funuction which assigns the integer  C
C     value of a variable from the calling program.               C
```

```
CCCCCCCCCCCCCCCCCCCCCCCCCCCCCCCCCCCCCCCCCCCCCCCCCCCCCCCCCC
C                                                          C
C  The variables 'ROW' and 'COL' are used to position the image  C
C     in the image array processor.  (user oriented)       C
C       (lines 0018-0020)                                  C
C                                                          C
CCCCCCCCCCCCCCCCCCCCCCCCCCCCCCCCCCCCCCCCCCCCCCCCCCCCCCCCCC

0018      IOFF=IVAL(OFFH)
0019      ROW=IVAL(ROWH)
0020      COL=IVAL(COLH)

CCCCCCCCCCCCCCCCCCCCCCCCCCCCCCCCCCCCCCCCCCCCCCCCCCCCCCCCCC
C                                                          C
C  The variable 'ISTEP' will be used to set up the software C
C     offset look up table.  The algorithm used is as follows: C
C                                                          C
C       1. Determine the number of offsets requested (line 0021) C
C                                                          C
C       2. Divide the entire range possible into that many C
C          sub-ranges.      (line 0021)                    C
C                                                          C
C       3. Set up a software look up table of offsets to be used C
C          as array values where the element number in the array C
C          will be the value of the intensity of the original C
C          pixel location before offset.  The amount of offset C
C          will then be the value in that element location in C
C          the array.(Called 'OFFSET')        (lines 0021-0029) C
C                                                          C
CCCCCCCCCCCCCCCCCCCCCCCCCCCCCCCCCCCCCCCCCCCCCCCCCCCCCCCCCC 0021            ISTEP=(256./(FLOAT(IOFF))+.5)
0022            ISET=0
0023 100        N=0
0024 200        k=k+1
0025            OFFSET(K)=ISET
0026            N=N+1
0027            IF  (N.LT.ISTEP)   GOTO 200
0028            ISET=ISET+1
0029            IF  (K.LT.256)   GOTO 100

CCCCCCCCCCCCCCCCCCCCCCCCCCCCCCCCCCCCCCCCCCCCCCCCCCCCCCCCCC
C                                                          C
C  User supplied subroutine to assign the proper colors to the C
C     respective channel assignment.                       C
C                                                          C
C       RED   → channel 1 normally                         C
C       GREEN → channel 2 normally                         C
C       BLUE  → always channel 3          (line 0030)      C
C                                                          C
CCCCCCCCCCCCCCCCCCCCCCCCCCCCCCCCCCCCCCCCCCCCCCCCCCCCCCCCCC

0030      CALL SPLIT(FCB,RED,GREEN,BLUE,0,0,0,0)

CCCCCCCCCCCCCCCCCCCCCCCCCCCCCCCCCCCCCCCCCCCCCCCCCCCCCCCCCC
C                                                          C
C  Pass through the rows of the disk image.  'NUMROW' is the C
C     actual number of rows in the image (supplied by the  C
C     calling program).                    (lines 0031-0056) C
C                                                          C
CCCCCCCCCCCCCCCCCCCCCCCCCCCCCCCCCCCCCCCCCCCCCCCCCCCCCCCCCC

0031      DO 300  ROWPTR=1,NUMROW
```

```
CCCCCCCCCCCCCCCCCCCCCCCCCCCCCCCCCCCCCCCCCCCCCCCCCCCCCCCCCCCCC
C                                                             C
C  User supplied routine to read one entire image row into     C
C     memory.  (called B1)              (line 0032)            C
C                                                             C
CCCCCCCCCCCCCCCCCCCCCCCCCCCCCCCCCCCCCCCCCCCCCCCCCCCCCCCCCCCCC

0032      IF  (SEMROW(1,B1,I,LV1))  RETURN

CCCCCCCCCCCCCCCCCCCCCCCCCCCCCCCCCCCCCCCCCCCCCCCCCCCCCCCCCCCCC
C                                                             C
C  Now process each element in current row of B1 where 'COLPTR' C
C      is column position on the monitor and in the image.     C
C      'NUMCOL' is the number of columns in the image and is   C
C      supplied by the calling program.       (lines 0033-0042 C
C                                                             C
CCCCCCCCCCCCCCCCCCCCCCCCCCCCCCCCCCCCCCCCCCCCCCCCCCCCCCCCCCCCC

0033      DO 400   COLPTR=1,NUMCOL

CCCCCCCCCCCCCCCCCCCCCCCCCCCCCCCCCCCCCCCCCCCCCCCCCCCCCCCCCCCCC
C                                                             C
C  Determine the intensity of the pixel and mask the value to a C
C     value in the range 0-255.               (line 0034)      C
C                                                             C
CCCCCCCCCCCCCCCCCCCCCCCCCCCCCCCCCCCCCCCCCCCCCCCCCCCCCCCCCCCCC

0034       INTENS=MASK.AND.ORIG(COLPTR)

CCCCCCCCCCCCCCCCCCCCCCCCCCCCCCCCCCCCCCCCCCCCCCCCCCCCCCCCCCCCC
C                                                             C
C  Determine the amount of offset shift in both directions using C
C      the 'INTENS' value as a pointer into the array 'OFFSET'. C
C      (Note: a value of 1 is added to the 'INTENS' to prevent an C
C      element pointer value of zero.)         (line 0035)     C
C                                                             C
C  Test the offset request in lines 0036 and 0039 and if offset C
C      will result in a position off the image, bypass it.     C
C                                                             C
C  If the offset location will be in the image plane, then test C
C      the current value found at the new location against the C
C      current intensity; keep the larger value of the two.    C
C      (lines 0037,0040)                                       C
C                                                             C
CCCCCCCCCCCCCCCCCCCCCCCCCCCCCCCCCCCCCCCCCCCCCCCCCCCCCCCCCCCCC 0035          IOFF=COLPTR+OFFSET(INTENS+1)
0036          IF (IOFF.GT.NUMROW)  GOTO 500
0037          IF (RIGHT(IOFF).LT.INTENS) RIGHT(IOFF)=INTENS
0038 500      IOFF=COLPTR-OFFSET(INTENS+1)
0039          IF (IOFF.LT.1)  GOTO 600
0040          IF (LEFT(IOFF).LT.INTENS) LEFT(IOFF)=INTENS
0041 600      CONTINUE
0042 400      CONTINUE CCCCCCCCCCCCCCCCCCCCCCCCCCCCCCCCCCCCCCCCCCCCCCCCCCCCCCCCCCCCC
C                                                             C
C  Find any values of zero and average the pixels intensity    C
C      values two places to either side and replace the zero with C
C      the average value calculated.       (lines 0043-0048)   C
C                                                             C
CCCCCCCCCCCCCCCCCCCCCCCCCCCCCCCCCCCCCCCCCCCCCCCCCCCCCCCCCCCCC
```

```
0043            DO 510    COLPTR-3,NUMCOL-2
0044               IF (LEFT(COLPTR).GT.0) GOTO 511
0045               LEFT(COLPTR=(LEFT(COLPTR-2)+LEFT(COLPTR-1)+
      +                        LEFT(COLPTR+1)+LEFT(COLPTR+2))/4
0046 511           IF (RIGHT(COLPTR).GT.0) GOTO 510
0047               RIGHT(COLPTR)=(RIGHT(COLPTR-2)+RIGHT(COLPTR-1)+
      +                          RIGHT(COLPTR+1)+RIGHT(COLPTR+2))/4
0048 510        CONTINUE

CCCCCCCCCCCCCCCCCCCCCCCCCCCCCCCCCCCCCCCCCCCCCCCCCCCCCCCCCCCCCCC
C                                                              C
C  User supplied subroutine to write one row of image data to  C
C     any channel of the image array processor. (lines 0049-0051) C
C                                                              C
CCCCCCCCCCCCCCCCCCCCCCCCCCCCCCCCCCCCCCCCCCCCCCCCCCCCCCCCCCCCCCC 0049            CALL IMAGE(FCB,LEFT,COL-1,ROW+ROWPTR-2,NUMCOL,
      +                    0,CH1,-1,0,1,0,0,0,0,0)
0050            CALL IMAGE(FCB,RIGHT,COL-1,ROW+ROWPTR-2,NUMCOL,
      +                    0,CH2,-1,0,1,0,0,0,0,0)
0051            CALL IMAGE(FCB,ORIG,COL-1,ROW+ROWPTR-2,NUMCOL,
      +                    0,CH3,-1,1,1,0,0,0,0,0)

CCCCCCCCCCCCCCCCCCCCCCCCCCCCCCCCCCCCCCCCCCCCCCCCCCCCCCCCCCCCCCC
C                                                              C
C  Zero arrays to insure no carry over of previous data.       C
C       (lines 0052-0055)                                      C
C                                                              C
CCCCCCCCCCCCCCCCCCCCCCCCCCCCCCCCCCCCCCCCCCCCCCCCCCCCCCCCCCCCCCC 0052            DO 700 COLPTR=1,NUMCOL
0053               LEFT(COLPTR)=0
0054               RIGHT(COLPTR)=0
0055 700        CONTINUE CCCCCCCCCCCCCCCCCCCCCCCCCCCCCCCCCCCCCCCCCCCCCCCCCCCCCCCCCCCCCCC
C                                                              C
C  Return to the calling program.                              C
C                                                              C
CCCCCCCCCCCCCCCCCCCCCCCCCCCCCCCCCCCCCCCCCCCCCCCCCCCCCCCCCCCCCCC 0056 300        CONTINUE
0057            RETURN
0058            END
```

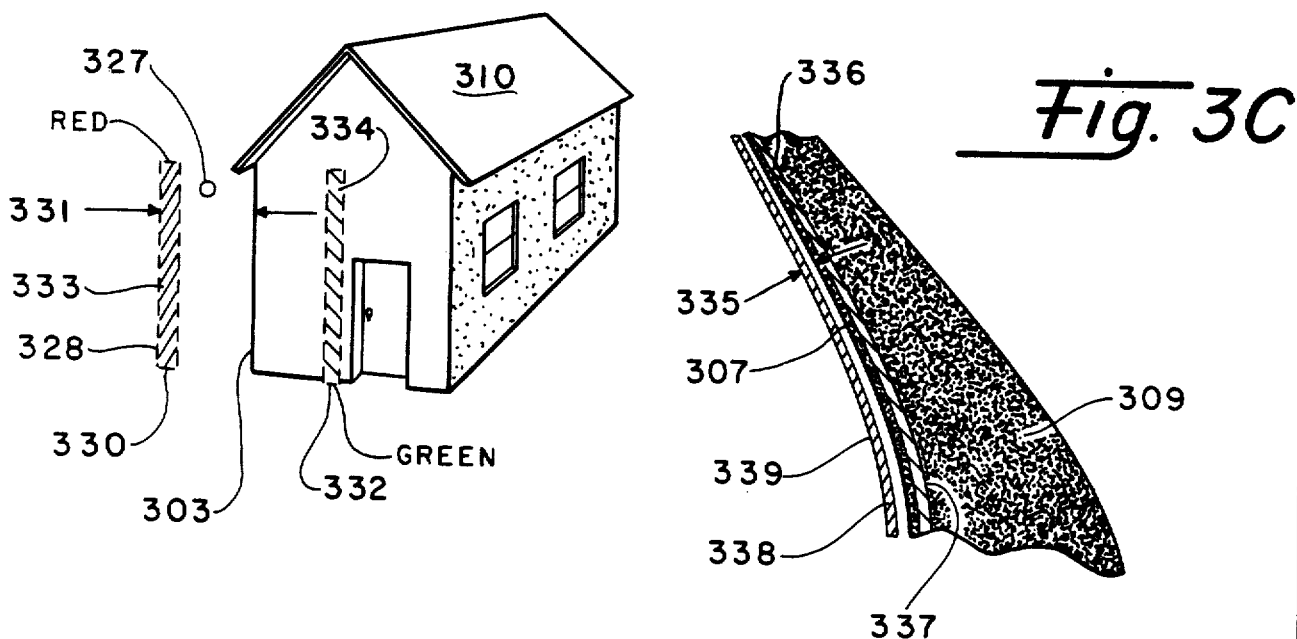

We claim:

1. A method for creating a stereoscopic analysis image from a monochrome input image having image features of varying pixel intensity comprising the steps of:

reproducing the original image pixel for pixel in a first color;

adding to the original image a second image comprised of second pixels of a second color each displaced from the corresponding original image pixel by a distance having a predetermined relationship with the intensity of said original image pixel;

viewing the composite reproduced image binocularly using color separation to preceive a stereoscopic view of the original image.

2. The method of claim 1 wherein said adding step includes adding pixels of a second color displaced in one direction from said original image pixel and introducing pixels of a third color displaced in the one hundred eighty degree opposite direction from said original image pixel.

3. The method of claim 2 wherein said added and introduced pixels are similar in intensity to the original image pixels.

4. The method of claim 2 wherein said color separation transmits said second color and is opaque to said third color in one half of said binocular view; is opaque to said second color and transmits said third color in the other half of said binocular view; and is opaque to said first color in both halves of said binocular view.

5. The method of claim 1 further including the step of smoothing the appearance of the reproduced image by replacing pixels of low intensity located between said added and introduced pixels with pixels having intensity related to that of nearby pixels.

6. Image generating apparatus comprising:
means for coding an input image into first signals representing image density at each image pixel;

means generating for each coded pixel signal a second and a third supplemental signal each magnitude related to said first signal according to a predetermined relationship;

means for reconstructing a scanned color summation image from said first, second and third signals including means responsive to said first signal for reproducing original image pixels in a first color and means responsive to said second and third signals for supplementing said reconstructed image original image pixels with pixels of a second and third color.

7. The apparatus of claim 6 wherein said means for coding an input image also includes means for scaling the image density values in said input image into a predetermined range of first signal values.

8. The apparatus of claim 6 wherein said image density is correlated with the physical density of a measured object.

9. The apparatus of claim 6 wherein said image density is correlated with increments of linear measure.

10. The apparatus of claim 6 wherein said image density represents strength of a received signal.

11. The apparatus of claim 10 wherein said received signal is a radio frequency signal.

12. The apparatus of claim 6 wherein said means responsive to said second and third signals includes means for locating said supplementing pixels according to said second and third signals.

13. The apparatus of claim 12 wherein said means for supplementing includes means for locating said pixels of second and third color on either side of a related original image pixel.

14. The apparatus of claim 13 further including binocular color segregation viewing apparatus responsive in a predetermined manner to said first, second and third colors.

15. The apparatus of claim 14 wherein said second color is red, said third color is green, said first color is blue and said color segregating viewing apparatus includes red and green transmitting filter elements.

16. The apparatus of claim 14 wherein said first color is grey, said second color is green and said third color is red.

17. The apparatus of claim 13 wherein said second and third color pixels are each located between zero and ten periodic pixel locations away from said original image pixel.

18. The apparatus of claim 13 wherein the location displacement of each said second and third color pixels is eight periodic pixel locations maximum for the most intense pixel and a proportionally smaller number of pixel locations for pixels of lesser intensity.

19. A method for generating visual analysis images comprising the steps of:
coding an input image into first electrical signals representing image density at each pixel of a periodically located set of pixel set;
generating for each coded pixel signal second and third supplemental electrical signals each magnitude related to said first signal by a predetermined algorithm;
reconstructing a scanned color summation visual image from said first, second, and third electrical signals using said first signal to control first second and thrid color intensities at each reconstructed image pixel and displacing the location of each second and third color reconstructed image pixel by a number of pixels determined by said second and third signal magnitudes;
segregating the color summation visual image into two depth conveying visual components.

20. The method of claim 19 wherein
said first electrical signals are digital signals and said predetermined algorithms is linear and incremental with predetermined small ranges of coded pixel signals resulting in identical second and third signal values.

21. The method of claim 19 wherein said predetermined algorithm is non-linear in nature.

22. The method of claim 19 further including the step of smoothing the magnitude of said second and third electrical signals over a predetermined number of pixel locations.

23. The method of claim 22 wherein said smoothing step includes increasing the density of zero density pixels located near said second and third color pixels.

24. The method of claim 22 wherein said steps of generating second and third signals and smoothing the magnitude of said second and third signals include digital computer and associated software processing of image signals.

25. A method for constructing a feature enhanced analysis image from an input image of varying pixel intensity comprising the steps of:
creating a frist variant of said input image wherein each image pixel is physically displaced in a first direction from its input image location in proportion to its intensity;
generating a second variant of said input image wherein each image pixel is physically displaced in a second direction from its input image location in proportion to its intensity;
viewing said first and second variant images stereoscopically.

26. Apparatus for constructing a feature enhanced analysis image from an input image of varying pixel intensity comprising:
means for creating a first variant of said input image wherein each image pixel is displaced physically in a first direction from its input image location in proportion to its intensity;
means for generating a second variant image of said input image wherein each image pixel is displaced physically in a second direction from its original image location in proportion to its intensity;
means for viewing said first and second variant images stereoscopically.

27. Image analysis apparatus comprising:
means for coding an input image into first electrical signals representing image intensity at each pixel;
means for linearly scaling said first electrical signals from the total of said image into second signals of a predetermined modulus;
means for sampling said second signals in increments of third electrical signals representing the pixels located along a scanned line of said input image;
computer means for generating fourth electrical signals representing pixels in said scanned line displaced forward along said scanned line by 8 pixel locations and less in proportion to pixel intensity;
computer means for generating fifth electrical signals representing pixels in said scanned line displaced backward along said scanned line by 8 pixel locations and less in proportion to pixel intensity;

computer means for smoothing said third, fourth and fifth electrical signals in scanned line increments said means including means for replacing zero intensity values of said signals with values related to the intensity of pixels within two adjacent pixel locations;

means for collecting said third, fourth and fifth electrical signals into an array capable of representing a reconstructed variation of said input image, said means including means allowing repeated accessing of the collected signals for display refreshment;

scanning display means connected, with said means for collecting, and including blue, red and green display pixels responsive respectively to said third, fourth and fifth collected electrical signals, for displaying said reconstructed image with periodic refreshment, said reconstructed image including a reproduction of said input image by said third electrical signals;

color segregating viewing means including red and green color filters for stereoscopic viewing of said reconstructed image.

* * * * *

UNITED STATES PATENT AND TRADEMARK OFFICE
CERTIFICATE OF CORRECTION

PATENT NO. : 4,558,359                    Page 1 of 2

DATED       : December 10, 1985

INVENTOR(S) : Gilbert G. Kuperman et al

It is certified that error appears in the above-identified patent and that said Letters Patent is hereby corrected as shown below:

At column 5, line 50, the comma should be a dash.

At column 5, lines 59-60, "of" should be "or".

At column 8, line 3, "pixed" should be "pixel".

Fig. 3C should appear as shown on the attached sheet.

Signed and Sealed this

Sixteenth Day of December, 1986

*Attest:*

DONALD J. QUIGG

*Attesting Officer*          *Commissioner of Patents and Trademarks*

UNITED STATES PATENT AND TRADEMARK OFFICE
CERTIFICATE OF CORRECTION

PATENT NO. : 4,558,359

DATED : December 10, 1985

INVENTOR(S) : Gilbert G. Kuperman et al

It is certified that error appears in the above-identified patent and that said Letters Patent is hereby corrected as shown below: